United States Patent

[11] 3,627,667

| [72] | Inventor | Erwin J. Plofsky |
| | | Deerfield, Ill. |
| [21] | Appl. No. | 746,985 |
| [22] | Filed | July 23, 1968 |
| [45] | Patented | Dec. 14, 1971 |
| [73] | Assignee | International Harvester Company |
| | | Chicago, Ill. |

[54] ELECTROMECHANICAL MACHINING SHORT CIRCUIT ELECTRODE DETECTOR
5 Claims, 6 Drawing Figs.

[52] U.S. Cl. .................................................. 204/224,
204/143 M, 204/228
[51] Int. Cl. .................................................. B23p 1/02,
C23b 5/76
[50] Field of Search .................................. 204/143 M,
224, 228

[56] References Cited
UNITED STATES PATENTS

| 3,219,564 | 11/1965 | Wilkinson | 204/224 X |
| 3,275,538 | 9/1966 | Haupt et al. | 204/143 |
| 3,440,156 | 4/1969 | Dickson | 204/143 |
| 3,448,024 | 6/1969 | Philpott | 204/143 |
| 3,468,775 | 9/1969 | Lanning et al. | 204/143 |
| 3,524,804 | 8/1970 | Gotz et al. | 204/224 |

*Primary Examiner*—C. F. Dees
*Attorney*—Floyd B. Harman

ABSTRACT: A method and apparatus for detecting a short circuit between the cutting electrode tool and workpiece in electrochemical machining. This detector takes advantage of the battery formed by the dissimilar electrode and workpiece metals saturated with an electrolyte by measuring the difference in the electromotive force when there is proper gap spacing and when there is metal-to-metal contact and preventing the power supply from being turned on when there is metal-to-metal contact, thus protecting the electrode tool from damage.

PATENTED DEC 14 1971

INVENTOR
ERWIN J. PLOFSKY

*Frederick J. Krubel*
ATT'Y

ELECTROMECHANICAL MACHINING SHORT CIRCUIT ELECTRODE DETECTOR

This invention relates to apparatus for use in the electrochemical machining process and more particularly to apparatus for preventing damage to the electrode tool through means for detecting a short circuit.

Electrochemical machining is the process for metal dissolving through the use of low voltage direct current, an aqueous salt solution as an electrolyte, and a cutting tool electrode. The workpiece is made positive and the electrode tool is made negative, and the salt water electrolyte acts to carry the current from the workpiece to the electrode tool so that when current flows, a chemical reaction takes place dissolving the workpiece metal. In such operation as drilling, shaping, broaching, turning and deburring, it is essential that a closely spaced gap be held between the electrode tool and the workpiece. This relatively close gap spacing, however, invites metal-to-metal contact and short circuiting. Should a short circuit occur, when the power is turned on, damage can occur to the electrode tool or the power supply. Present maximum current sensing shutoff devices usually protect the rectifier circuitry of the power supply from short circuit but are not completely effective for protecting the electrode from this short circuit damage. The reason is that the power can be turned on even though only for a short period, i.e., until the power supply circuit breaker opens, but this is enough to damage the electrode tool because high current would flow for this short time through a point on the electrode tool. Thus, when a burr is present on the workpiece and the electrode tool is thus inadvertently shorted to the workpiece, high current shunted through the burr will cause resistive and arcing heating at the electrode and cause damage to the electrode tool when the power is turned on even though damage to the power supply may be prevented.

By using this invention, the power supply cannot be turned on if a short exists and tool damage is prevented.

This invention is based upon the electromotive force generated by the battery formed when the gap between the electrode tool and the workpiece of dissimilar metals is filled with an electrolyte. The magnitude and polarity of the electromotive force are dependent upon the metals' properties. If the electrode tool is short circuited to the workpiece, then the voltage measured is substantially reduced. A voltage comparator, or an operational amplifier comparator, meter relay, or solid state switch is used to detect the difference between the normal and short circuited electrode conditions. When the comparator senses a short circuit, it acts to operate a relay interlocked into the rectifier control circuit of the power supply to prohibit the power supply from being turned on.

Figure 1:
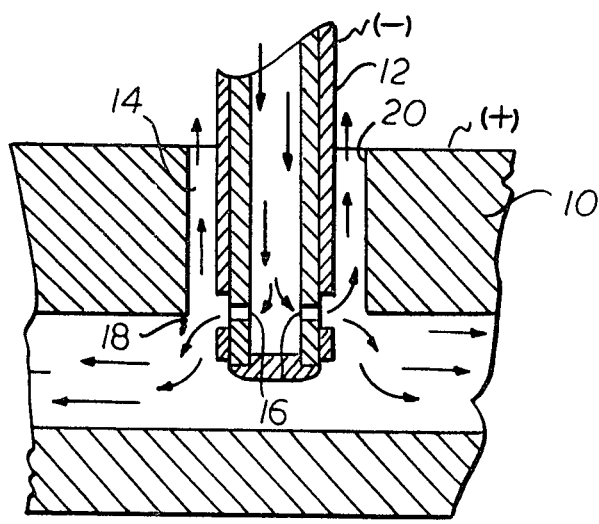
FIG. 1 is a greatly enlarged diagrammatic elevational view of an electrochemical machining tool and workpiece, taken partly in section axially of the electrode tool illustrating a typical electrochemical deburring operation.

FIG. 1 shows the typical deburring operation on a workpiece 10 and a hollow dielectric coated tool 12 which are maneuvered relative to one another. In this typical operation a DC power supply is connected across the gap 14 so that the workpiece 10 serves as the anode and the tool 12 as the cathode. The power supply normally delivers a high DC power at low voltage into the gap. A suitable electrolyte, such as in aqueous salt solution, flows through the hollow electrode tool 12 and out through the apertures 16, as shown by the flow arrows. During the process, the gap 14 preferably does not change appreciably so that there will be substantially no variations or disturbances in the current flow between the workpiece 10 and the tool 12.

In the operation shown in FIG. 1, the purpose is to remove burrs, such as burr 18, by the electrochemical process from a previously bored hole 20 in the workpiece 10. Normally, electrochemical removal of the burr 18 takes place with the gap 14 maintained between the workpiece 10 and/or the burr 18. Inasmuch as the gap spacing 14 is normally rather close, metal-to-metal contact is invited due to unfavorably located burrs. When such a contact occurs, present maximum current sensing shut off devices will protect the rectifier in the power supply.

Such maximum current sensing shutoff devices as presently used, however, are of no value in the present deburring operation where the tool is inserted into the workpiece prior to the current being turned on. In such a case, if the burr was located so as to contact the tool upon insertion, the power supply could be turned on for a short period until the power supply circuit breaker, or shutoff sensing device, opens. Even in this short time, the tool would be damaged because high current would flow for a short time at the point where the burr and the tool were in metal-to-metal contact causing resistive heating and arcing. By using this invention, the power supply cannot be turned on if such a short circuit exists.

Figure 2:
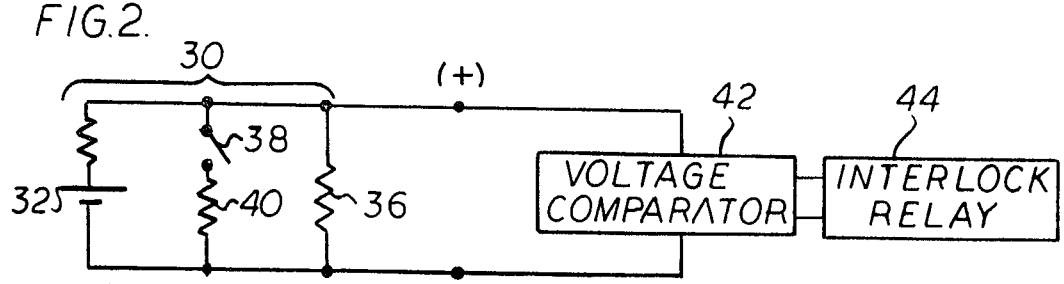
FIGS. 2, 3, 4, 5 and 6 show the equivalent circuits involved in the battery formed by the workpiece and the electrode tool and various means for preventing the operation of the power supply when the electromotive force in the battery has dropped below a predetermined value.

Turning now to FIG. 2, it is to be noted that the equivalent circuit 30 comprises the battery 32 formed by the dissimilar metals of the electrode tool 12 and the workpiece 10 and connected metal parts in contact with the electrolyte, the series resistance 34 of the electrolyte between the dissimilar metals, shunting resistance 36 of any power supply rectifier connected in the circuitry and of electrolyte between similar metals. The short circuit is represented by switch 38 and resistance 40. As shown in FIG. 2, a voltage comparator 42 is connected to the positive and negative terminals and the output of the comparator thereof is connected to a relay 44 interlocked into the rectifier of the power supply (not shown).

Figure 3:
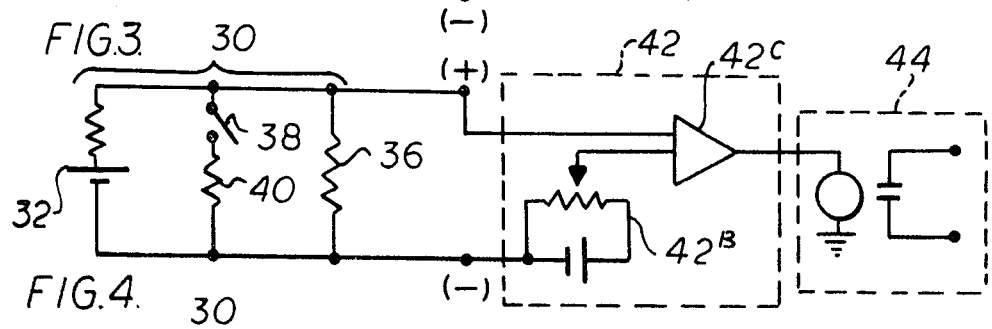

Turning now specifically to FIG. 3, there is shown the equivalent circuit 30 with a voltage comparator 42 shown in the form of an operational amplifier 42a, one input terminal of which is connected to the positive terminal and the other input terminal is connected through a variable bias or reference voltage supply 42b. Interlock relay 44 is shown schematically in this figure. The bias voltage supply is set to any selected value depending on the type of dissimilar metals involved to form battery 32, and if a voltage drop is sensed by the operational amplifier 42a by means of a short represented by a closing of switch 38, the relay interlock 44 is opened preventing the power supply from being turned on.

Figure 4:
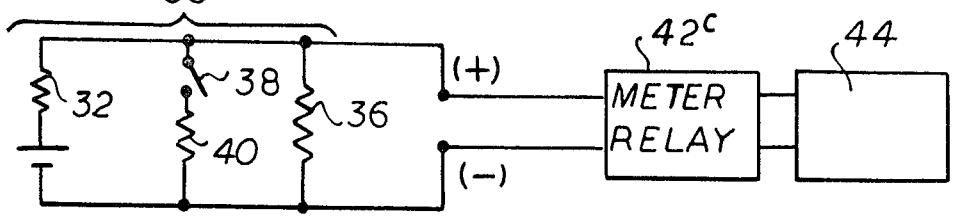

FIG. 4 shows an alternative embodiment in which the voltage comparator 42a and 42b is replaced with a meter relay 42c which, in turn, is connected to the interlock relay 44.

Figure 5:
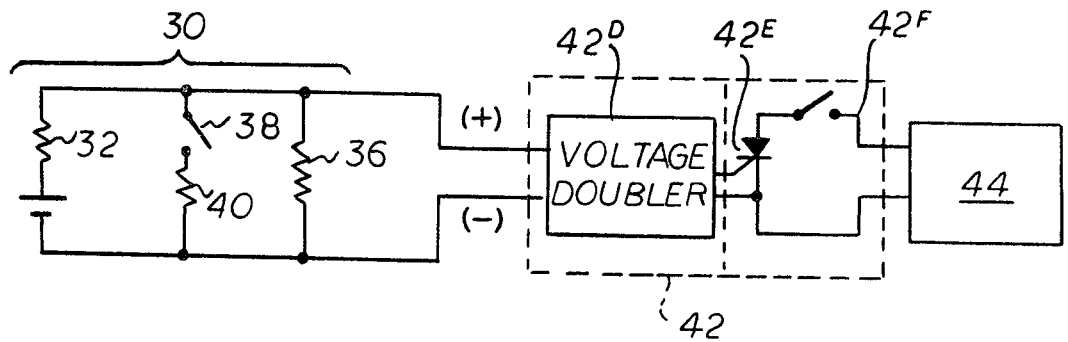

FIG. 5 shows still another means for preventing the power supply from being turned on under a short condition. In this disclosure circuit 30 is connected to a voltage doubler 42d, the output of which is fed into a silicon controlled rectifier 42e and a reset relay 42f interposed between the voltage doubler and the interlock relay 44.

Figure 6:
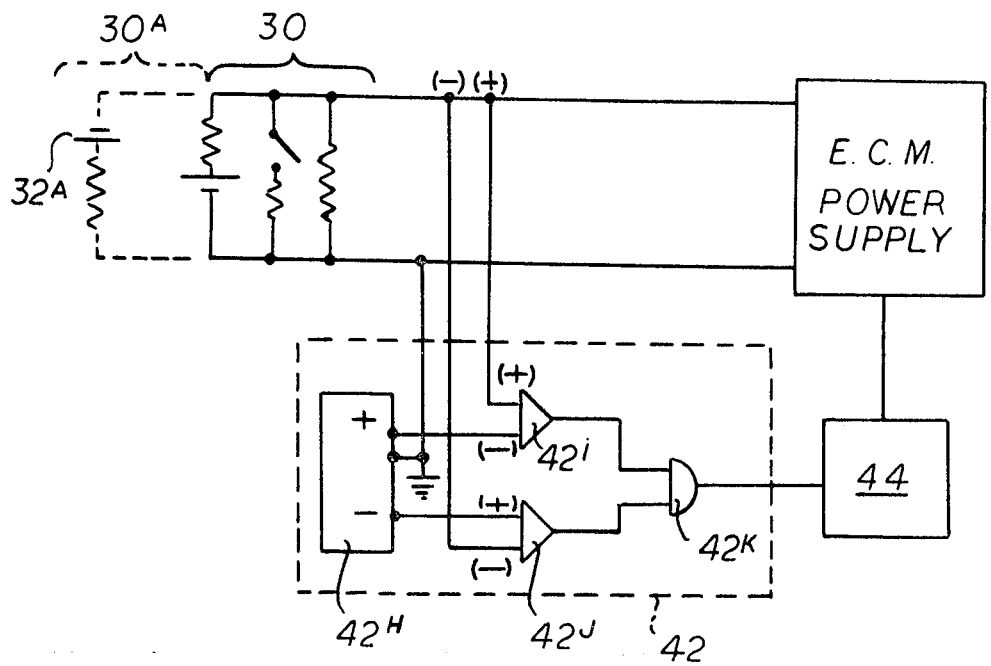

In FIG. 6, there is shown still another means of preventing the power supply from being turned on when there is a short circuit under two different battery conditions.

It is recognized that both the polarity and magnitude of the electromotive force of the battery depends upon the amount of time elapsed since the last electrochemical machining operation charges certain short-term stray cells present in the battery and the effect can be one of opposite polarity to the long-term cells present. The embodiment shown in FIG. 6 is capable of detecting the net electromotive force of either polarity provided this electromotive force is greater than the reference voltage. In this Figure, the long-term cell, as previously described, and its equivalent circuit is shown at 30 with a voltage comparator 42 connected to the relay interlock 44. The electrochemical power supply is shown in this figure for purposes of clarity. With the battery under the previously described condition, voltage comparator 42 with a reference voltage supply 42h (such as voltage supply 42b of FIG. 3) would supply the reference voltage to the comparator 42i which, for example, could be a differential amplifier. If the reference voltage exceeds the voltage produced by the battery, an output signal produced by comparator 42*i* will enable OR-gate 42*k* which, in turn, will permit the interlock relay to be actuated or opened preventing the main DC power supply from being turned on.

However, in the event that there is a reversal of battery polarity due to short-term stray cells, the circuitry of such a reversal of polarity is shown in the battery 32*a* and equivalent circuit 30*a*. Equivalent circuit 30*a* is shown connected into the equivalent circuit 30 and forms a part thereof since this is a true picture of actual operation conditions. In the event of a drop in voltage by reason of a short circuit under conditions where the battery reversed polarity, this short circuit will be detected by the voltage comparator 42 with its reference voltage supply 42*h* and comparator 42*j*. When such a short circuit is detected by the comparator 42*j*, this difference will be noted by the OR-gate 42*k* which will permit the interlock relay 44 to be actuated. Comparator 42*j*, like comparator 42*i*, can be a differential amplifier.

From the foregoing it can be seen that this invention utilizes the battery formed by the dissimilar metals of the electrode tool and the workpiece and connected other dissimilar metallic parts in contact with the electrolyte to prevent damage to the tool when a short exists by preventing the power supply from being turned on. In operation, the operator inserts the electrode tool 12 into the previously bored hole in the workpiece 10 at which time the electrolyte is either pumped into or is allowed to leak into the gap 14. The battery formed thereby is sensed and the electromotive force generated is detected and compared by the comparator 44 to either stop further processing or permits the power supply to be turned on as the case may be. The immediate operation of the invention prevents damage to the electrode tool.

What is claimed is:

1. In electrochemical machining apparatus, including an electrode tool and workpiece of dissimilar metals normally spaced with respect to each other to provide a gap therebetween so that in the presence of a DC source the chemical reaction of an electrolyte disposed in said gap dissolves the metal of said workpiece, the improvement comprising:
    means for detecting the electromotive force generated between said electrode tool and workpiece prior to the application of the DC source thereto;
    comparator means for comparing the detected electromotive force with a predetermined reference voltage; and
    interlock means operatively connected to said comparator means and responsive to the operation thereof for preventing the DC source from being applied when said comparator means indicates the detected electromotive force has an absolute value less than said predetermined reference voltage.

2. The improvement as set forth in claim 1, wherein said comparator means includes an operational amplifier, a source for said reference voltage operatively connected to said operational amplifier, and means for varying the value of the reference voltage supplied by said reference voltage source.

3. The improvement as set forth in claim 1, wherein said comparator means comprises meter relay means.

4. The improvement as set forth in claim 1, wherein said comparator means includes a voltage doubler and a solid state, silicon controlled rectifier, the output of said voltage doubler being operatively coupled to said silicon controlled rectifier.

5. The improvement as set forth in claim 1, wherein said comparator means comprises a pair of comparators, a source of voltage for supplying said reference voltage to each of said comparators, and an OR gate, the input of said OR gate being operatively coupled to said comparators so as to sense the output signal from both of said comparators and the output of said OR gate being operatively coupled to said interlock means, whereby the possibility of a reversal of polarity of electromotive force and a drop in the value of such reversed polarity electromotive force can be detected.

* * * * *